Dec. 6, 1966  G. F. TISINAI  3,290,137
MOLD APPARATUS FOR FORMING GLASS LINED VESSELS
Original Filed Feb. 1, 1960
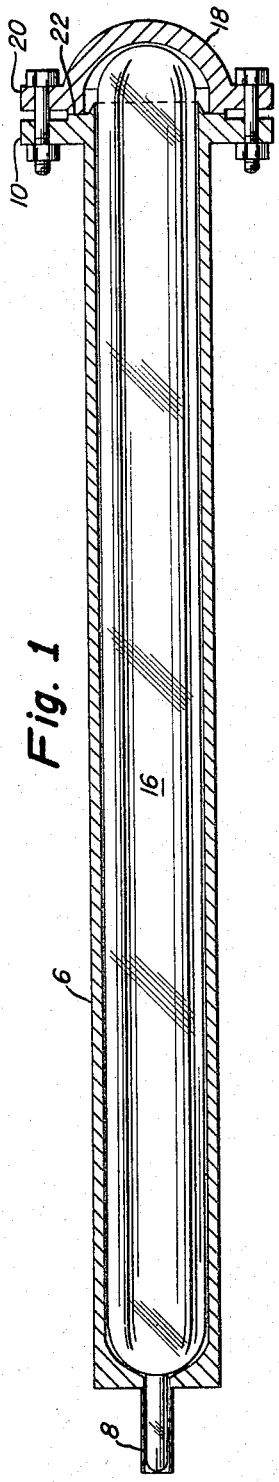
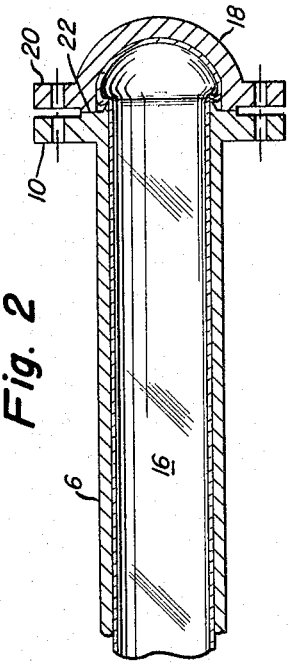
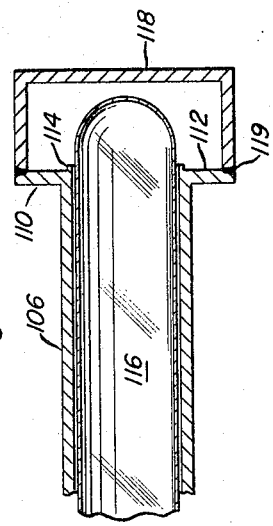
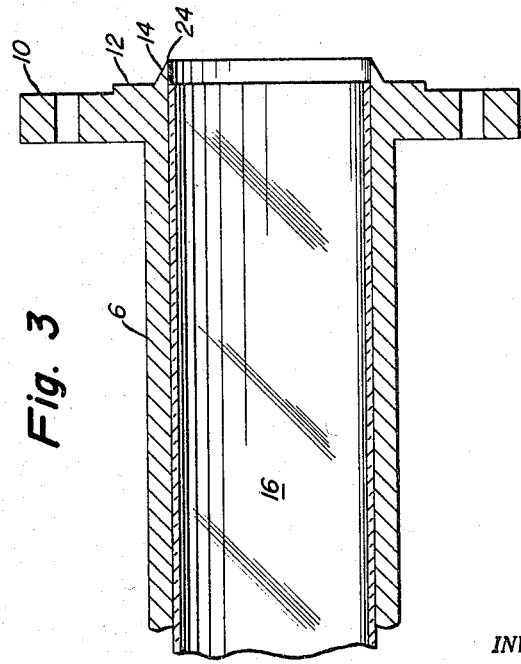
INVENTOR.
George F. Tisinai
BY
ATTORNEY United States Patent Office 3,290,137
Patented Dec. 6, 1966

3,290,137
MOLD APPARATUS FOR FORMING GLASS LINED VESSELS
George F. Tisinai, Highland, Ind., assignor to Standard Oil Company, Chicago, Ill., a corporation of Indiana
Original application Feb. 1, 1960, Ser. No. 5,986. Divided and this application Dec. 8, 1965, Ser. No. 521,476
1 Claim. (Cl. 65—299)

This is a division of application Serial No. 5,986, filed February 1, 1960.

This invention relates to a method of lining a vessel and, more particularly relates to a method of applying a glass lining to the interior surface of a vessel.

Various types of fluids exhibit properties detrimental to metallic vessels. These fluids may, for example, cause embrittlement of the metal, react with the metal, be corrosive to the metal, or cause abrasion of the metal. Various materials such as, for example, glass, plastic, and ceramic materials have been used as a substitute for metallic containers. The utility of glass, plastic or ceramic vessels however, is limited to lower pressures and temperatures.

Metallic vessels have been lined with various materials such as plastics, rubber, ceramics, and the like. Heretofore, the lining techniques required a flux or bonding material to hold the lining material in contact with the metal walls of the vessel. The use of a bonding material between the exterior of the liner and the interior of the vessel is generally undesirable because the bonding material is normally weaker (structurally) than either the liner or the vessel. Certain bonding materials will allow a slight movement of the liner before the liner is restrained by the vessel. This problem is not serious with elastic type liners as these liners will tolerate a slight deformation.

Glass linings, on the other hand, will tolerate little, if any deformation. An uneven application of bonding material may actually cause the development of a heterogeneous stress pattern as pressure is applied to the interior of the liner. I have found that an improved glass lined vessel can be fabricated by positioning the glass liner in direct contact with the interior surface of the vessel.

Briefly described, a glass lined vessel is fabricated by placing a glass envelope within the interior of a reaction vessel. The vessel and glass envelope are heated to the softening temperature of the glass. Expansion of the gases within the glass envelope due to temperature increase causes the glass envelope to expand into contact with the vessel. The vessel and glass unit are then cooled to form a glass lined vessel.

An object of this invention is to provide a glass lining for a reaction vessel. Another object of this invention is to provide a glass lining which is placed in continuous contact with the interior surface of the reaction vessel. Yet another object of this invention is to provide a method of lining disassembled parts of a vessel such that as the parts are assembled, the glass forms a continuous internal lining for the assembled vessel. Still another object of this invention is to provide a method of expanding a glass envelope into contact with a metal vessel to form a glass coating therein. Additional objects will become apparent as the following description which is to be read in connection with the annexed drawings proceed. In these drawings:

FIGURE 1 is a view, partially in cross section, which illustrates the position of the glass envelope within the vessel prior to the heating step;

FIGURE 2 is a view, in cross section, which illustrates the position of the glass envelope within the vessel subsequent to the heating step;

FIGURE 3 is a view, in cross section, which illustrates the position of the glass lining after a portion of the lining near the cap end has been removed from within the vessel; and FIGURE 4 is a view, partially in cross section, which illustrates an alternate cap enclosure.

In further reference to the drawings and, more particularly to FIGURE 1, a tubular vessel 6 includes an inlet pipe 8 formed integrally therewith and having a flange 10 on one end thereof. The flange 10 includes a flange face 12 and a fold ring 14. A glass liner 16 is shown positioned within the tubular vessel 6. The glass liner 16 is sealed at both ends to form an envelope of glass. A cap 18 is formed to close the end of the tubular vessel 6 and contains a cap flange 20 and cap flange face 22.

FIGURE 4 illustrates an alternate arrangement for enclosing the end of the tubular vessel 106. A flange 110 includes a flange face 112 and a fold ring 114. A glass liner 116 is shown positioned within the tubular vessel 106. The cap 118 is sealed to the flange 110 as by a weld 119. The cap 118 may be removed subsequent to forming the lining such as, for example, by sawing or machining.

In operation, the glass envelope 16 is positioned within the tubular vessel 6. This glass envelope is sealed to prevent the escape of gas therefrom. The tubular vessel containing the glass envelope is heated to a softening temperature of the glass while simultaneously maintaining the pressure in the annulus (between the exterior of the envelope and the interior of the tubular vessel 6) substantially less than the pressure within the envelope. The annulus pressure is preferably maintained under a partial vacuum. The increased gas pressure within the glass envelope, which pressure results from increasing the temperature of the gas within the envelope, in combination with the softened condition of the envelope causes the envelope to expand outwardly into continuous contact with the interior surface of the tubular vessel 6. The end portion of the glass envelope which is inside the cap 18 is enlarged and conforms to the interior surface of the cap 18 (FIGURE 2). The glass envelope is folded about the point 24 of the fold ring 14. This fold in the glass envelope creates a zone of high stress and causes a weakness in the glass lining. The tubular vessel and the glass lining are subsequently cooled and the cap 18 removed from the end of the tubular vessel. The removal of the cap 18 causes the end of the glass envelope to break adjacent the point 24 of the fold ring 14.

The thickness of the glass lining in the fold over the point 24 of the fold ring 14 is considerably less than the thickness of the glass lining within the remaining portion of the vessel. A shield such as, for example, a rubber plug may be placed within the glass lining in alignment with the flange face 12. The portion of the glass between the flange face 12 and the point 24 of the fold ring 14 (FIGURE 3) is then removed by conventional glass removal techniques such as, for example, by sand blasting. The rubber plug or shield may then be removed from the glass lining and the fold ring 14 removed by any conventional means such as, for example, by machining the fold ring 14 flush with the flange face 12.

The term, glass, as used herein is defined as a silicate glass, that is, oxide glasses which contain 60–100% $SiO_2$ and various percentages of two or more other inorganic oxides such as sodium, potassium, calcaum,, magnesium, lead, boron, aluminum, zinc, and barium oxides all in mutual solution. The glass is an inorganic product of fusion which has been cooled to a rigid condition without crystallization.

Various types of glasses which have been found suitable for use in lining vessels are soda-lime glasses, lead glasses, borosilicate glasses (Pyrex), 96% silica glasses (Vycor), and silica glasses. The following table illustrates the general classification of the particular types of commercial glasses.

| Component | Composition, percent | | | | |
|---|---|---|---|---|---|
| | Soda-lime | Lead | Borosilicate | 96% Silica | Silica glass |
| $SiO_2$ | 70-75 (72) | 53-68 (68) | 73-82 (80) | 96 | 99.8 |
| $Na_2$ | 12-18 (15) | 5-10 (10) | 3-10 (4) | | |
| $K_2O$ | 0-1 | 1-10 (6) | 0.4-1 | | |
| $CaO$ | 5-14 (9) | 0-6 (1) | 0-1 | | |
| $PbO$ | | 15-40 (15) | 0-10 | | |
| $B_2O_3$ | | | 5-20 (14) | 3 | |
| $Al_2O_3$ | 0.5-2.5 (1) | 0-2 | 2-3 (2) | | |
| $MgO$ | 0-4 (3) | | | | |

The figures in parentheses give the approximate composition of a typical member.

The preferred lining materials are the Pyrex and Vycor glasses. These two particular glasses are heat-resistant and low-expansion types. The Vycor and Pyrex glasses possess better chemical durability, mechanical durability, better electrical properties, and preferred thermal expansion coefficients than the lower silica content glasses such as, for example, soda-lime glass and lead glass. It is generally recognized that the Vycor and Pyrex glasses are also considerably more difficult to shape than the lower silica content glasses. The following examples illustrate the utility of the disclosed method of lining vessels.

*Example I*

A tubular Pyrex liner having an outside diameter of 38 mm. was closed under a partial atmospheric pressure and placed inside a 2.25% chromium, 1% molybdenum alloy steel 2″ x 30″ schedule 80 pipe. The temperature of the pipe and the enclosed tubular Pyrex liner was increased from a temperature of 80° F. to a temperature of 1350° F. in a 1½ hour period while simultaneously maintaining the annular space between the liner and the pipe under partial vacuum. The apparatus were maintained at 1350° F. for a period of ½ hour and subsequently cooled to room temperature. The apparatus were cooled from 1350° to 1000° F. during a 3½ hour period. The apparatus were subsequently cooled to room temperature during a 10 hour period.

The reactor vessel thus formed was placed in service handling a mixture of gases which included the following components:

| | Percent |
|---|---|
| Carbon monoxide | 10 |
| Carbon dioxide | 25 |
| Methane | 25 |
| Hydrogen | 40 |
| Water | Trace |

The reactor was pressure tested at 750 p.s.i. and at 650° F. prior to each run. A 4″ section in the middle of the reactor was then heated to a reaction temperature of 550° F., 600° F., or 650° F. and the apparatus were held at the specified reaction temperature and 500 p.s.i. for a period of 100 hours after which time the apparatus were cooled to room temperature. Five runs were made at 650° F., four runs were made at 550° F., and one run was made at 600° F. An additional pressure test was made at 750 p.s.i. and a temperature of 800° F. A run was made at a temperature of 800° F. and a pressure of 500 p.s.i. for a period of 24 hours. Another pressure test was made at a temperature of 1200° F. and a pressure of 750 p.s.i. Two additional runs were made at a temperature of 950° F. and a pressure of 500 p.s.i. for periods of 24 hours and 100 hours. An inspection of the reactor vessel subsequent to the above mentioned runs revealed no change in the condition of the liner.

*Example II*

A tubular Pyrex liner having an outside diameter of 38 mm. was closed under a partial atmospheric pressure and placed inside a 2.25% chromium, 1% molybdenum alloy steel 2″ x 30″ schedule 80 pipe. The temperature of the pipe and the enclosed Pyrex liner was increased from a temperature of 80° F. to a temperature of 1350° F. in a 1½ hour period while simultaneously maintaining the annular space between the liner and the pipe under a partial vacuum. The apparatus were maintained at 1350° F. for a period of ½ hour and subsequently cooled to room temperature. The apparatus were cooled from 1350° F. to 1000° F. over a 3½ hour period and from 1000° F. to room temperature over a 10 hour period.

This reactor vessel was tested at a pressure of 750 p.s.i. by maintaining the first 6″ near the inlet end of the reactor at about 600° F., the middle 4″ of the reactor at about 1200° F. and the last 10″ near the outlet end of the reactor at about 150° F. for a period of less than 1 hour. The gas utilized in the test was nitrogen. There was no detectable change in the condition of the liner due to the above mentioned high-pressure and high-temperature test.

The above description of a tubular reaction vessel is given by way of illustration and not by way of limitation. Other sizes and shapes of reaction vessels such as, for example, spherical, conical, frusto-conical, rectangular and the like may be used in lieu of the tubular reaction vessel.

Although I have described my invention with reference to a specific embodiment, it is not intended that the same shall be regarded as a limitation upon the scope of the invention except insofar as included in the accompanying claim.

I claim:

An apparatus for forming a glass lining within a vessel comprising a vessel having an outlet therein, a fold ring attached to said outlet forming a continuous surface with said outlet, a sealed glass envelope within said vessel, and a cap attached to said vessel, said cap having a greater internal diameter than the outer diameter of the fold ring to surround said fold ring and confine said envelope.

References Cited by the Examiner

UNITED STATES PATENTS

| 2,986,847 | 6/1961 | Sato | 65—59 X |
| 3,155,479 | 11/1964 | Zimmerman | 65—70 |

FOREIGN PATENTS

| 16,846 | 1891 | Great Britain. |

DONALL H. SYLVESTER, *Primary Examiner.*

A. D. KELLOGG, *Assistant Examiner.*